(12) United States Patent
Avonto et al.

(10) Patent No.: US 9,683,582 B2
(45) Date of Patent: Jun. 20, 2017

(54) IMPELLER FOR A VENTILATION UNIT AND VENTILATION UNIT COMPRISING SAID IMPELLER

(71) Applicant: Entsorgafin S.P.A., Tortona (IT)

(72) Inventors: Alessandro Avonto, Tortona (IT); Gian Francesco Galanzino, Tortona (IT); Pietro Paolo Cella Mazzariol, Tortona (IT)

(73) Assignee: Entsorgafin S.p.A., Tortona (AL) (IT)

( * ) Notice: Subject to any disclaimer, the term of this patent is extended or adjusted under 35 U.S.C. 154(b) by 344 days.

(21) Appl. No.: 14/402,738

(22) PCT Filed: May 23, 2013

(86) PCT No.: PCT/IB2013/054278
§ 371 (c)(1),
(2) Date: Nov. 21, 2014

(87) PCT Pub. No.: WO2013/175430
PCT Pub. Date: Nov. 28, 2013

(65) Prior Publication Data
US 2015/0086371 A1    Mar. 26, 2015

(30) Foreign Application Priority Data

May 23, 2012  (IT) .............................. TO2012A0450

(51) Int. Cl.
*F04D 29/30*  (2006.01)
*F04D 29/70*  (2006.01)
(Continued)

(52) U.S. Cl.
CPC ........... *F04D 29/706* (2013.01); *F04D 17/16* (2013.01); *F04D 23/00* (2013.01); *F04D 29/162* (2013.01);
(Continued)

(58) Field of Classification Search
CPC .. F04D 29/162; F04D 29/282; F04D 29/2216; F04D 29/2222; F04D 29/30;
(Continued)

(56) References Cited

U.S. PATENT DOCUMENTS 2,801,042 A * 7/1957 Thygeson ............. F04D 29/162
415/148
3,824,029 A * 7/1974 Fabri ..................... F04D 29/288
415/109
(Continued)

FOREIGN PATENT DOCUMENTS

DE    102008053144 A1    4/2010
EP       1431262 A1    6/2004
(Continued)

*Primary Examiner* — Ninh H Nguyen
(74) *Attorney, Agent, or Firm* — Howson & Howson, LLP (57) ABSTRACT

An impeller for a ventilation unit, especially for use in plants for the aerobic treatment of organic waste, is provided. The impeller comprises a housing, a pair of mutually facing plates received within the housing and provided centrall with a through-hole for a cylindrical hub, and a plurality of first radial blades arranged between the plates. The impeller further comprises second radial blades arranged on at least one plate, on its side facing the inner wall of the housing and extending from the cylindrical hub toward the periphery for creating an under-pressure zone in the central region of the impeller itself, at its hub. Thanks to this measure, condensate water deriving from the humidity of the air sucked/blown by the ventilation unit is prevented from leaking along the rotation shaft of the impeller, towards its motor and towards the outside environment.

7 Claims, 6 Drawing Sheets

(51) Int. Cl.
*F04D 23/00* (2006.01)
*F04D 29/22* (2006.01)
*F04D 29/16* (2006.01)
*F04D 29/28* (2006.01)
*F04D 17/16* (2006.01)
*F04D 29/44* (2006.01)
*F24F 7/007* (2006.01)

(52) U.S. Cl.
CPC ....... *F04D 29/2222* (2013.01); *F04D 29/282* (2013.01); *F04D 29/30* (2013.01); *F04D 29/444* (2013.01); *F24F 7/007* (2013.01); *F05D 2210/13* (2013.01)

(58) Field of Classification Search
CPC ........ F04D 31/00; F04D 23/003; F24F 7/007; F05D 2210/13
See application file for complete search history.

(56) References Cited

U.S. PATENT DOCUMENTS

| | | | | |
|---|---|---|---|---|
| 4,378,196 A | * | 3/1983 | Leskinen | F04D 29/051 415/104 |
| 5,839,374 A | * | 11/1998 | Conner | F04D 23/001 110/162 |
| 5,988,979 A | | 11/1999 | Wang | |
| 6,264,430 B1 | * | 7/2001 | Hulkkonen | F04D 29/023 416/186 R |
| 2009/0162198 A1 | | 6/2009 | Ogino et al. | |

FOREIGN PATENT DOCUMENTS

| JP | H02-140492 A | 5/1990 |
|---|---|---|
| JP | 2007-198268 A | 8/2007 |

\* cited by examiner

IMPELLER FOR A VENTILATION UNIT AND VENTILATION UNIT COMPRISING SAID IMPELLER

TECHNICAL FIELD

The present invention refers to an impeller for a ventilation unit.

The present invention further refers to a ventilation unit comprising such an impeller.

Particularly, the present invention refers to an impeller for a ventilation unit and to a ventilation unit applicable to plants for the aerobic treatment of organic waste.

PRIOR ART

Methods for the aerobic treatment of materials containing putrescible substances, especially for the treatment of urban solid waste, are known and widespread. In particular such methods provide for the materials to be subjected to a phase of aerobic fermentation.

In some known methods for the treatment of urban solid waste the whole waste mass is subjected to an accelerated fermentation stage by sucking air through the waste heap positioned within a closed environment on a pavement provided with holes and said heap of waste is periodically moved for ensuring correct aeration thereof.

In other known methods for the treatment of urban solid waste, the aerobic treatment of organic waste is effected by means of a fermentation/bio-oxidation phase obtained by means of forced air, during which an alternate air flow in two opposite directions is generated, so that the air is alternately sucked/blown through the waste mass.

An example of a plant for the aerobic treatment of organic waste according to this second kind of method is described for instance in European Patent EP 1 431 262 in the name of the present Applicant.

A drawback common to the known methods for treating organic waste lies in the fact that air—especially the air sucked through the waste heap, but possibly also the air sucked from the outer environment and blown through the waste heap—is charged with humidity.

Consequently, condensate water may be formed and leak along the axis of the impeller of the ventilation unit used for sucking or sucking/blowing air through the waste heap.

Such condensate air can cause malfunctioning of the motor of the ventilation unit, thus jeopardizing the reliability thereof.

Moreover, in case of humid air coming from the waste heap, the corresponding condensate water is contaminated and foul-smelling and an exit thereof into the outer environment is undesirable.

It is the main object of the present invention to overcome the aforesaid drawback by preventing condensate water from exiting along the axis of the impeller.

This and other objects are achieved by an impeller and a ventilation unit as claimed in the appended claims.

DISCLOSURE OF THE INVENTION

Thanks to the fact that the impeller according to the invention provides for the presence of means adapted to generate an under-pressure area in the central region of the impeller itself, condensate water is prevented from leaking along the axis of the impeller itself. Particularly, according to a preferred embodiment of the invention, said impeller comprises a housing, a pair of solid disk-like plates, arranged mutually facing and parallel at a certain distance from each other and provided centrally with a through-hole for a cylindrical hub, a plurality of first radial blades arranged between said plates and extending from said hub, for moving a gas flow, and a plurality of second radial curved blades extending on at least one of said plates, on the side of said plate remote from the other plate and facing the inner wall of the housing, said second curved blades cooperating, in use, with said inner wall of said housing for creating, in the central region of said plates, a zone having a pressure lower than that on the peripheral zone of said plates.

In this respect it is to be noted that the document JP 2007-198268 apparently shows an impeller equipped with a pair of plates having first radial blades arranged between said plates, and second radial blades arranged on one side of one of said plates opposite to the other plate. However, the impeller described in said document has a structure and an operation substantially different from those of the impeller according to the invention. In particular, whereas the impeller according to the invention has a pair of solid disk-like plates passed through solely by the central hub, the impeller described in JP 2007-198268 has an annular plate and the second radial blades are arranged just on said annular plate, a relevant central portion of said plate being completely open. Consequently in JP 2007-198268 the second radial blades cannot have the function of creating, in the central region of said plates, a zone having a pressure lower than that in the peripheral region of said plates.

Similarly, the document DE 102008053144 describes an impeller equipped with a pair of plates, one of which is an annular plate, where first radial blades are arranged between said plates and second radial blades are arranged on the side of the annular plate opposite to the other plate.

In this case, too, as the second radial blades are arranged in the periphery of an annular plate, they cannot have the function of creating, in the central region of said plates, a zone having a pressure lower than that in the peripheral region of said blades.

In this connection in DE 102008053144 there is mentioned a comparison between the pressure in the outer region of the first blades and the pressure in the outer region of the second blades, but no mention is made as to any difference of pressure between the center and the periphery of the described impeller.

More in general, neither in JP 2007-198268 nor in DE 102008053144 there are disclosed means for creating an under-pressure zone in the central region of the impeller, as said documents describe impellers provided with an annular plate that leaves a wide central portion of the impeller totally free and accessible.

BRIEF DESCRIPTION OF THE DRAWINGS

Features and advantages of the present invention will become more apparent from the detailed description of a preferred embodiment of the impeller for ventilation unit and of the ventilation unit according to the present invention, provided by way of non-limiting example, with reference to the attached drawings, in which:

FIG. 3b shows, in a sectional view, a detail of the ventilation unit of FIG. 3a;

DESCRIPTION OF A PREFERRED EMBODIMENT

Figure 1:
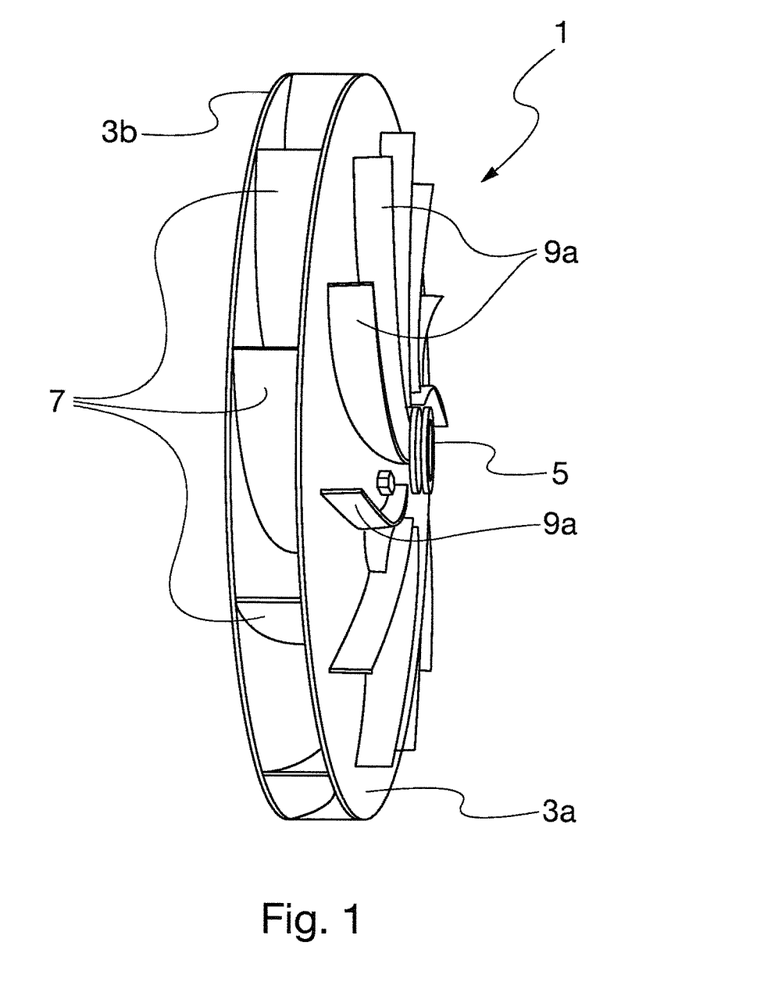
FIG. 1 is a perspective view of an impeller according to the invention.
Figure 2:
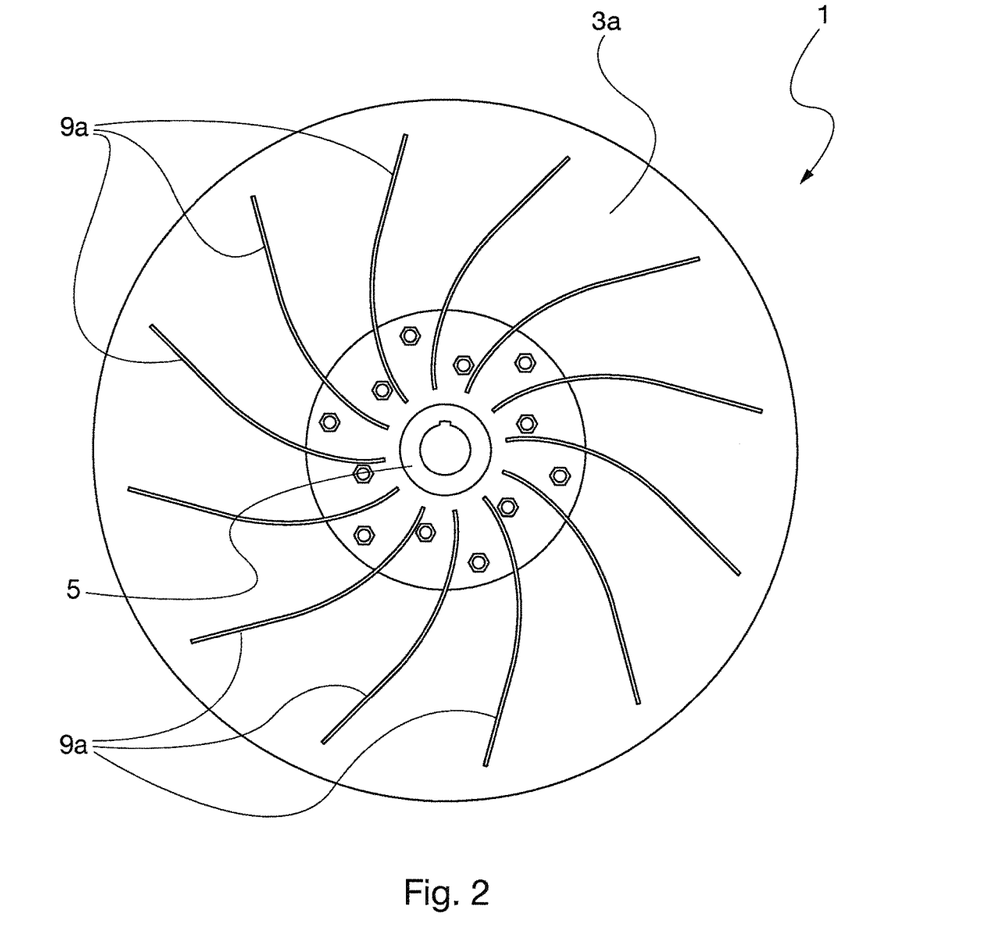
FIG. 2 is a side view of the impeller of FIG. 1.

With reference to FIGS. 1 and 2, the impeller for ventilation unit 1 according to the invention comprises a housing (not shown in FIGS. 1 and 2, but visible in FIGS. 3a, 3b) which houses at its inside a pair of solid disk-like plates 3a,3b, arranged mutually parallel and facing each other at a certain distance from each other.

Centrally the plates 3a,3b have a through-hole for a cylindrical hub 5 provided for receiving the rotation shaft of the impeller 1.

From the hub 5, a plurality of first radial blades 7 extend between the plates 3a,3b and are provided for moving the air flow to be sucked or blown by the ventilation unit.

Preferably said first radial blades are not straight, but have a curved profile allowing to increase their efficiency, said curved profile being selected so that they present a concave surface to the air flow.

According to the invention, at least a first one of the plates 3a,3b of the impeller 1 has, on its side opposite to the side facing the second of said plates 3b,3a, a plurality of second radial blades 9a extending from the hub 5 towards the periphery of said at least first plate 3a,3b.

Preferably, the second radial blades 9a too are not straight but have a curved profile similar to that of the first radial blades 7.

It will be evident that said second radial blades 9a extend between the corresponding plate of the impeller and the inner wall of the housing of the impeller itself.

Consequently, thanks to the presence of the second radial blades 9a, when the impeller 1 is driven in rotation around its rotation shaft, a zone of under-pressure is created in the central portion of the plates 3a,3b of the impeller 1, at hub 5; in other words, in use, the pressure in the central region of the impeller 1 is lower than the pressure in the peripheral region of said impeller 1. By means of said under-pressure zone, the condensate water deriving from the humidity of air cannot reach the hub and leak along the rotation axis of the impeller.

The presence of said second radial blades 9a thus allows to attain the object set forth above.

As can be seen in FIG. 1, both the first radial blades 7 and the second radial blades 9a are preferably arranged equally spaced along the circumference of the impeller 1.

In addition, the second radial blades 9a are preferably provided in a number equal to that of the first radial blades 7 and are provided in an offset arrangement with respect to the latter along the circumference of the impeller 1.

Depending on the requirements, the second radial blades can be provided only on one of the plates 3a,3b, or on both plates 3a,3b, on the side opposite to the side facing the other plate 3b,3a, respectively.

Figure 3A:
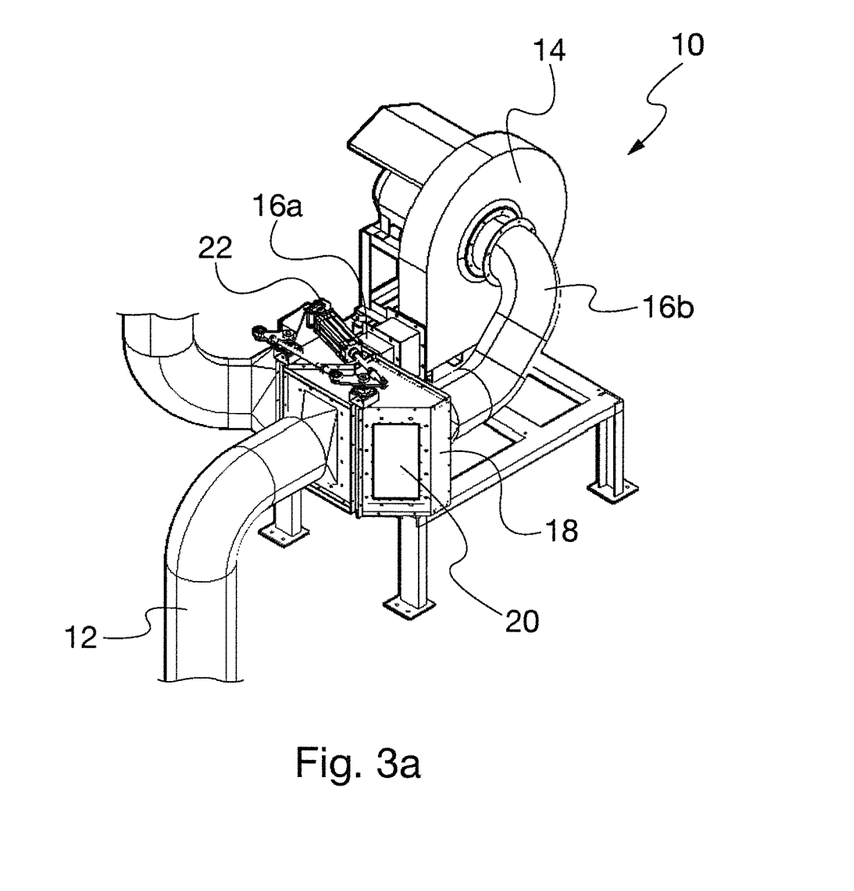
FIG. 3a is a perspective view of a ventilation unit incorporating the impeller of FIGS. 1 and 2.

In FIG. 3a there is shown a ventilation unit 10 incorporating an impeller 1 according to the invention.

In particular, in the illustrated embodiment said ventilation unit 10 is a ventilation unit with flow reversal allowing to alternately suck/blow air into a piping arrangement 12 without changing the rotation direction of the impeller 1.

The ventilation unit 10 includes a first duct or suction duct 16a and a second duct or delivery duct 16b connected to the housing 14 of the impeller 1.

In particular, in the illustrated embodiment said first duct or suction duct 16a and said second duct or delivery duct 16b connect said housing 14 to a deflecting unit 18.

Thanks to the presence of suitable deflecting elements 20 driven by an actuator 22, said deflecting unit 18 is capable of selectively connecting said suction duct 16a and said delivery duct 16b to the outer environment or to the piping arrangement 12, so as to suck air from said piping arrangement and blow air into it in an alternate manner.

Figure 3B:
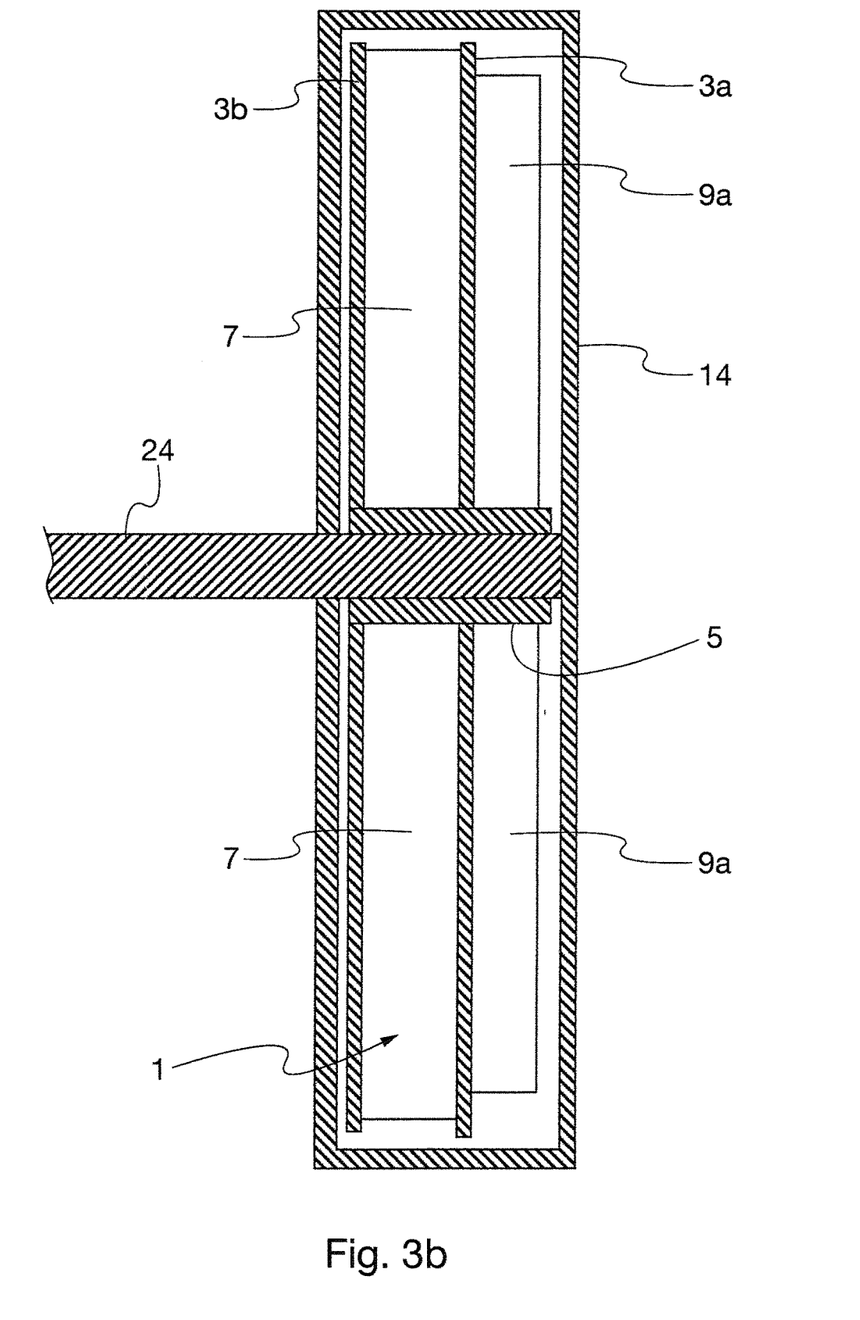

FIG. 3b shows very schematically in a cross-sectional view the detail of the ventilation unit 10 concerning the connection of the rotation axis of said ventilation unit to the housing 14 of the impeller 1 according to the invention.

As can be well seen in this Figure, the presence of the second radial blades 9a on the side of the plate 3a opposite to the other plate 3b and facing the inner wall of the housing 14 allows to create an under-pressure zone in the central region of the impeller 1, at hub 5, thus avoiding the risk of leakages of condensate water along the rotation axis 24 of the impeller 1, towards the motor of the impeller and towards the outer environment.

It will therefore be evident to the person skilled in the art that the impeller 1 according to the invention allows to efficiently attain the aimed object.

It will also be evident that what has been described above with reference to the embodiment shown has been provided only by way of example and that several modifications and variants are possible without departing from the scope of the invention as defined by the appended claims.

In particular, the second radial blades 9a can be replaced with other equivalent means for creating, in the central region of the impeller 1 according to the invention, a zone with a pressure lower than that of the peripheral region of the impeller 1.

As mentioned in advance above, said impeller is especially advantageous for being used in ventilation units employed in plants for the aerobic treatment of organic waste and the like.

Figure 4A:
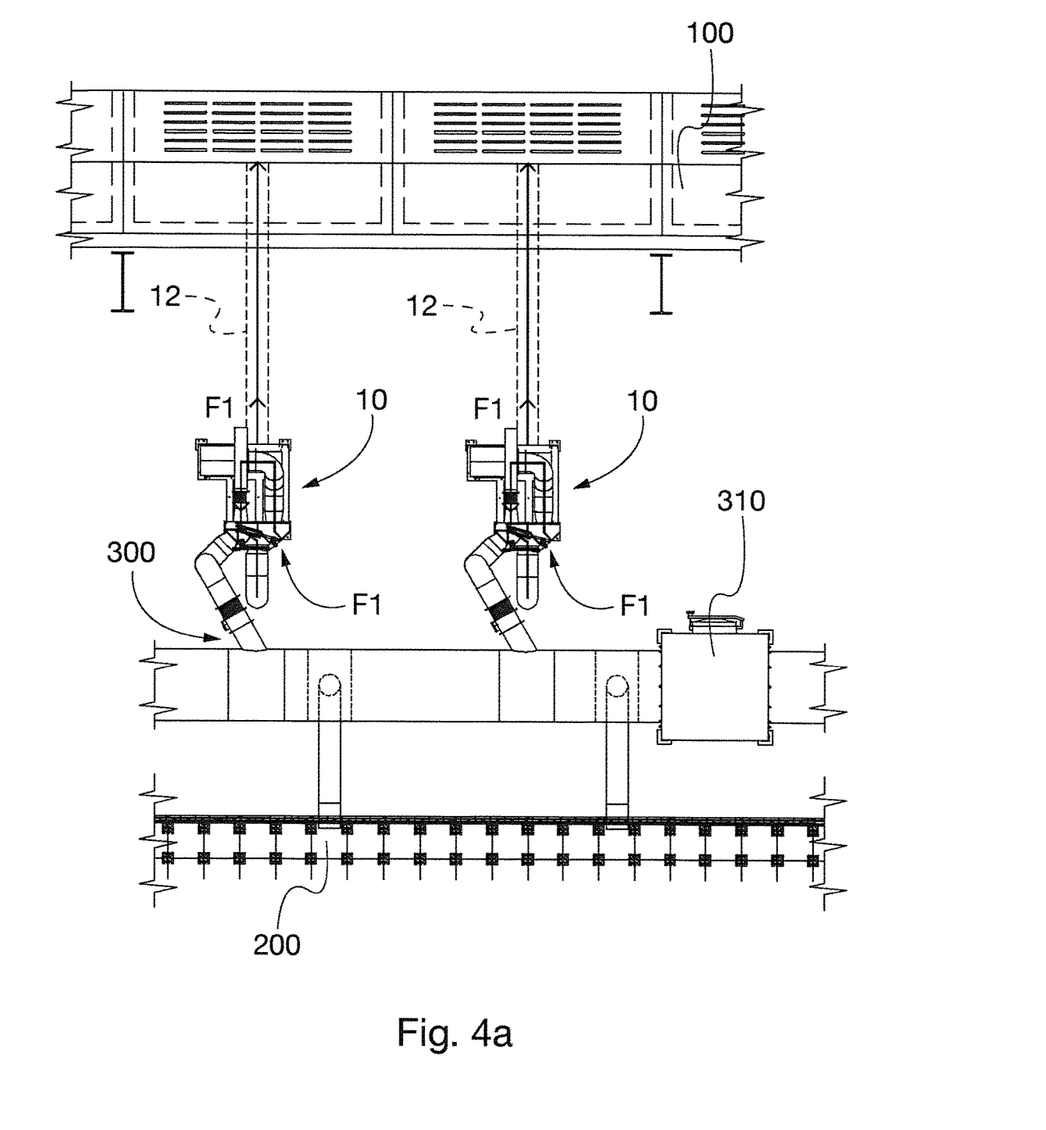
FIGS. 4a e 4b show schematically an exemplary application of the ventilation unit of FIG. 3a to a plant for the aerobic treatment of organic waste.
Figure 4B:
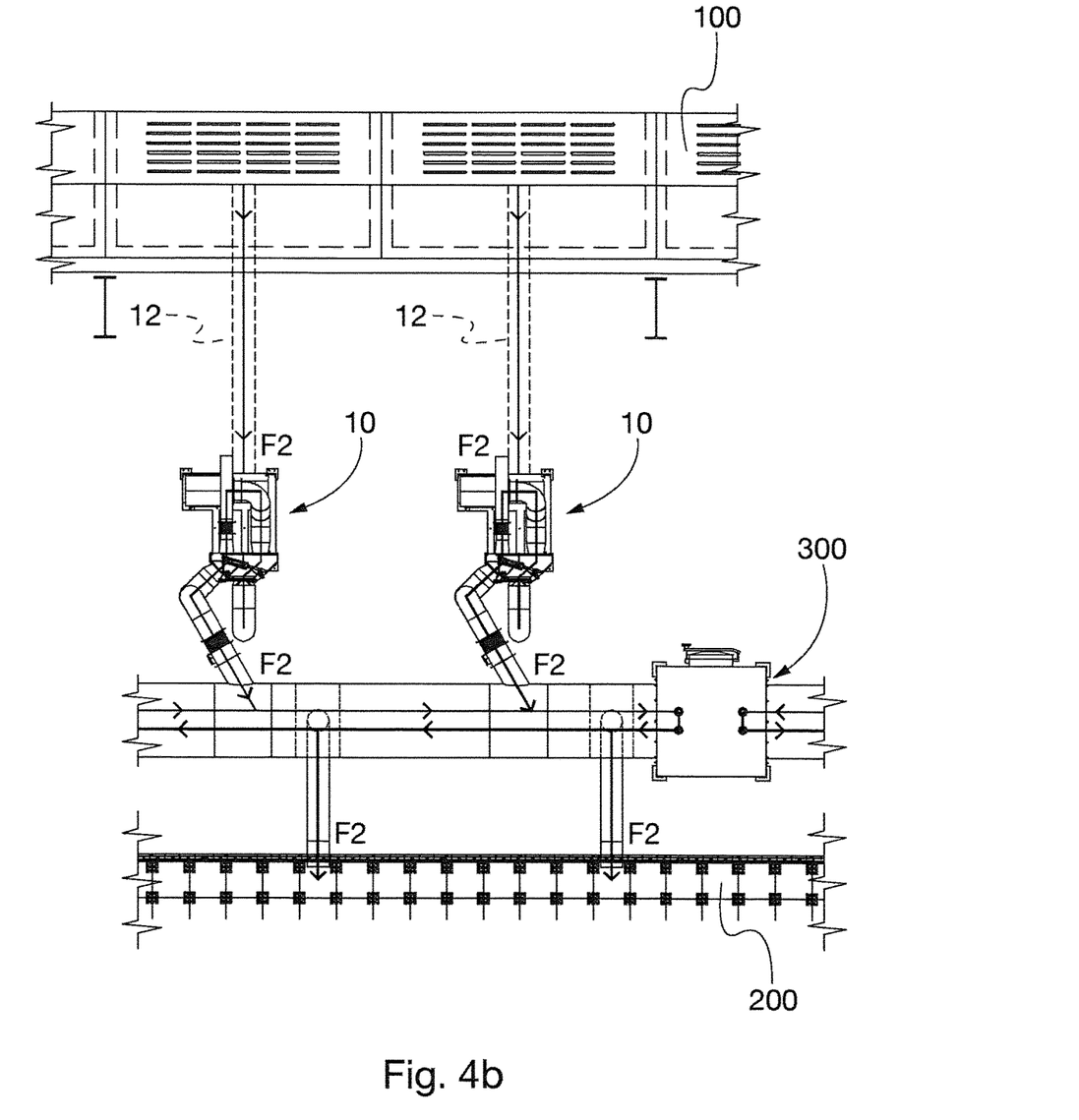

In this respect FIGS. 4a e 4b show an example of possible application of the invention to the aerobic treatment of organic waste.

In such application a plurality of ventilation units 10 are connected on one part, through their respective piping arrangements 12, to a bio-oxidation area where the organic waste to be subjected to aerobic treatment is located, and on the other part to the outer environment, through a discharge piping arrangement 300 and a bio-filter 200 for filtering air before it is exhausted to the outer environment.

The ventilation units 10 with flow reversal allow to alternately suck an air flow from the outer environment and blow it into the bio-oxidation area 100—as indicated by the arrows F1 in FIG. 4a—or to suck an air flow from the bio-oxidation area 100 and exhaust it to the outer environment through the discharge piping arrangement 300 and the bio-filter 200—as indicated by the arrows F2 in FIG. 4b.

In both cases, the use of impellers according to the invention in ventilation units 10 advantageously allows to prevent condensate water from leaking along the rotation shafts of said impellers towards their respective motors and towards the outer environment.

This measure is especially convenient in the operation mode shown in FIG. 4b, as the air sucked from the bio-oxidation area 100 is particularly humid and charged with contaminants.

The impeller according to the present invention can be made of different materials depending on its intended applications. For applications to the treatment of organic waste, it is preferably made of metal materials such as steel, or other materials suitable for withstanding chemical aggression by components that may be present especially in the contaminated air flow coming from the bio-oxidation area.

The invention claimed is:

1. An impeller for a ventilation unit, comprising a housing, a pair of solid disk-like plates, received within said housing arranged mutually facing and parallel at a certain distance from each other and provided centrally with a through-hole for a cylindrical hub, a plurality of first radial blades arranged between said plates and extending from the cylindrical hub, wherein on at least a first one of said plates, on its side opposite to a side facing a second one of said plates and facing an inner wall of said housing there are provided a plurality of second radial blades extending from said cylindrical hub towards a periphery of said at least a first one of said plates, said second radial blades cooperating, in use, with said inner wall of said housing for creating, at the cylindrical hub of said plates, a zone having a pressure lower than that in a peripheral zone of said plates.

2. The impeller according to claim 1, wherein said second radial blades extend perpendicularly to a surface of said at least a first one of said plates, between said at least a first one of said plates and said inner wall of said housing.

3. The impeller according to claim 1, wherein said first radial blades and said second radial blades are arranged equally spaced along a circumference of said at least a first one of said plates of said impeller.

4. The impeller according to claim 3, wherein said second radial blades are provided in a number equal to that of said first radial blades and are provided in an offset arrangement with respect to the latter along the circumference of said at least a first one of said plates of said impeller.

5. The impeller according to claim 1, wherein said first radial blades and said second radial blades have a curved profile that gives them a concave shape.

6. A ventilation unit, comprising:
an impeller comprising a housing and a pair of solid disk-like plates received within said housing and arranged mutually facing and parallel at a certain distance from each other and provided centrally with a through-hole for a cylindrical hub, a plurality of first radial blades arranged between said plates and extending from said cylindrical hub;
a rotation shaft connected to said cylindrical hub; and
a motor for driving in rotation said rotation shaft,
wherein on at least a first one of said plates of said impeller, on its side opposite to a side facing a second one of said plates and facing an inner wall of said housing there are provided a plurality of second radial blades extending from said cylindrical hub towards a periphery of said at least a first one of said plates, said second radial blades cooperating, in use, with the inner wall of said housing for creating, at said cylindrical hub of said plates, a zone having a pressure lower than that in a peripheral zone of said plates,
whereby, when said motor drives in rotation said rotation shaft, a pressure inside said housing in a central region of said impeller is lower than a pressure inside of said housing in a peripheral region of said impeller.

7. The ventilation unit according to claim 6, wherein said second radial blades extend perpendicularly to a surface of said at least a first one of said plates, between said at least a first one of said plates and said inner wall of said housing.

* * * * *